(No Model.)

R. H. WALKER.
NUT LOCK.

No. 593,913. Patented Nov. 16, 1897.

Witnesses
J. C. Shaw
Chas. E. Brock

Inventor
R. H. Walker
by O'Meara & Co.
Attorneys

UNITED STATES PATENT OFFICE.

ROBERT H. WALKER, OF WASHINGTON, IOWA, ASSIGNOR OF TWO-THIRDS TO ROBERT SHIELDS, OF SAME PLACE, AND W. C. LINTON, OF OTTUMWA, IOWA.

NUT-LOCK.

SPECIFICATION forming part of Letters Patent No. 593,913, dated November 16, 1897.

Application filed February 3, 1897. Serial No. 621,865. (No model.)

*To all whom it may concern:*

Be it known that I, ROBERT H. WALKER, residing at Washington, in the county of Washington and State of Iowa, have invented a new and useful Nut-Lock, of which the following is a specification.

This invention relates generally to locks, more particularly to a nut-lock, and is especially adapted for use in connection with railroad-rails, though it will of course be understood that my invention can be applied to bridges and the like, the object of the invention being to provide an exceedingly cheap, simple, and durable nut-lock by means of which the nut can be permanently and securely fastened to the bolt, so that it will be impossible for said nut to become loosened or untwisted.

With this object in view my invention consists in the peculiar construction of its various parts and in their novel combination or arrangement, all of which will be fully described hereinafter and pointed out in the claim.

Figure 1:
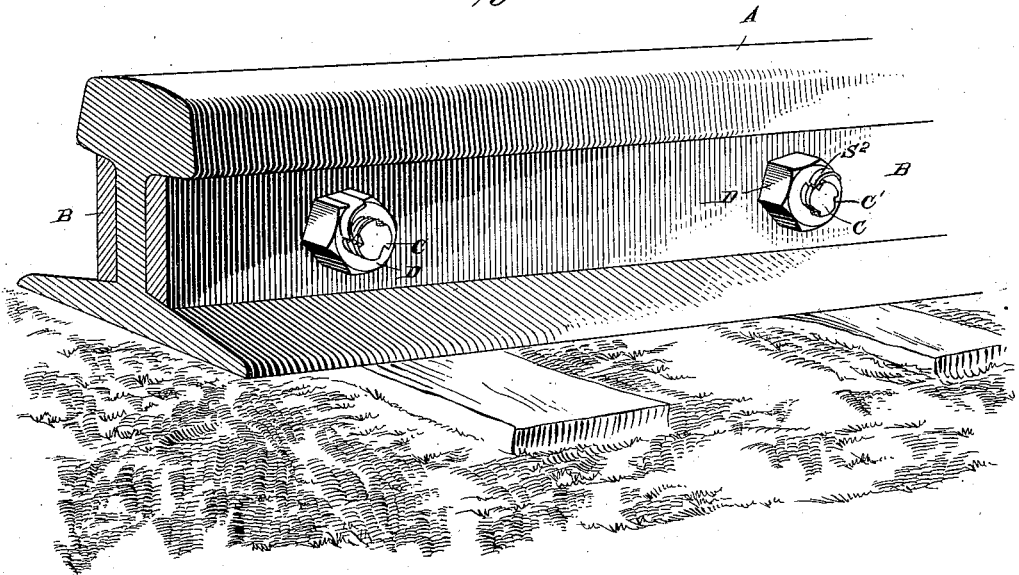
Figure 2:
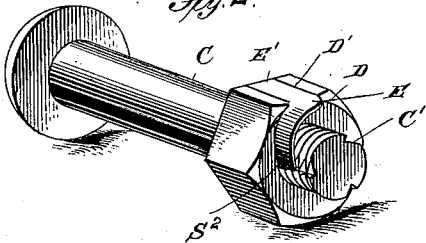
Figure 3:
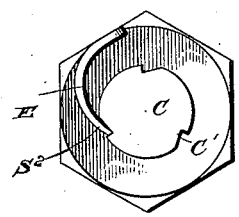
Figure 4:
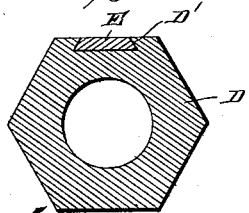
Figure 5:
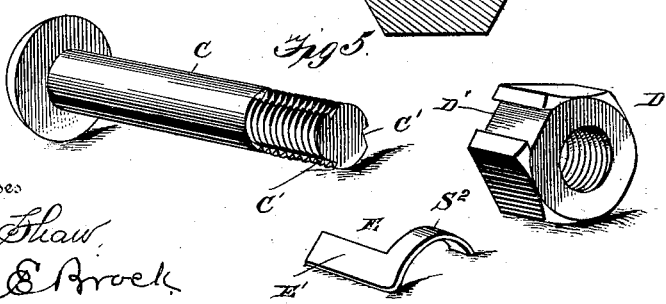

In the drawings forming a part of this specification, Figure 1 is a view showing the practical application of my invention. Fig. 2 is a perspective view showing all of the parts attached. Fig. 3 is a face view of the nut. Fig. 4 is a vertical sectional view of the nut. Fig. 5 shows the various parts detached.

In the application of my invention I employ, as an illustration, the ordinary construction of railroad-rails A, the fish-plate B connecting them.

The bolt C is constructed as usual, except that it has one or more longitudinal grooves C' upon the threaded end, and the nut D is secured upon the bolt in the usual manner. The nut D may be hexagonal or square, as desired; but in the drawings I have shown my invention as applied to a hexagonally-shaped nut. Upon one of the sides of the nut is a dovetailed recess D'.

The right-angular-shaped locking-pawl E is constructed of spring metal and comprises the body portion E' and spring-tongue $S^2$, said body portion being beveled and slidably connected with the recess D'; but, if desired, it can be fastened thereon in any desirable manner.

The spring-tongue of the locking-pawl E fits snugly around the threaded end of the bolt and engages the longitudinal groove C', thereby preventing the nut from working off, said grooves being constructed after the pattern of a ratchet.

It will thus be seen that I provide an exceedingly cheap and simple device for holding the nut in position and preventing same from working loose.

Having thus described my invention, what I claim as new, and desire to secure by Letters Patent, is—

In a nut-lock, the combination with a bolt provided with a plurality of longitudinal grooves in its threaded portion, of a nut having a dovetail recess in its periphery, and a locking-pawl consisting of a body having its longitudinal edges beveled to fit in the recess of the nut, and a spring-tongue projecting laterally from one end of the body, said tongue being curved to fit around the bolt and having its end engaging one of the grooves of the bolt, substantially as shown and described.

ROBERT H. WALKER.

Witnesses:
J. F. HENDERSON,
HARRY A. MONTGOMERY.